United States Patent [19]
Stanley et al.

[11] Patent Number: 5,530,858
[45] Date of Patent: Jun. 25, 1996

[54] METHOD AND APPARATUS FOR BACKGROUND PROCESSING FOR PCMCIA CARD SERVICES

[75] Inventors: James C. Stanley, Portland; David A. Sandage, Forest Grove; Stewart W. Hunt, Portland; Arland D. Kunz, Beaverton, all of Oreg.

[73] Assignee: Intel Corporation, Santa Clara, Calif.

[21] Appl. No.: 41,811

[22] Filed: Apr. 1, 1993

[51] Int. Cl.$^6$ .................................................. G06F 9/00
[52] U.S. Cl. .................... 395/650; 364/280; 364/281.3; 364/281.7; 364/DIG. 1
[58] Field of Search ................................. 395/275, 500, 395/700, 650; 364/280, 281.3, 281.7

[56] References Cited

U.S. PATENT DOCUMENTS

| | | | |
|---|---|---|---|
| 5,291,585 | 3/1994 | Sato et al. | 395/500 |
| 5,337,412 | 8/1994 | Baker et al. | 395/275 |
| 5,404,494 | 4/1995 | Garney | 395/500 |
| 5,412,798 | 5/1995 | Garney | 395/500 |

OTHER PUBLICATIONS

Publication of the Personal Computer Memory Card International Association (PCMCIA) entitled: Card Services—Release 1.11; Sunnyvale, California, Aug. 16, 1992.
Publication of the Personal Computer Memory Card Inernational Association (PCMCIA) entitled: PC–Compatible Socket Services Binding, Draft 2.00c; Sunnyvale, California, Sep. 12, 1992.
Publication of the Personal Computer Memory Card International Association (PCMCIA) entitled: PCMCIA Socket Services Interface Specification, Draft 2.00c; Sunnyvale, California, Sep. 12, 1992.
PCMCIA, "Card Services—Release 1.11", Aug. 16, 1992, pp. 1–137.

Primary Examiner—Kevin A. Kriess
Assistant Examiner—Dennis M. Butler
Attorney, Agent, or Firm—Blakely, Sokoloff, Taylor & Zafman

[57] ABSTRACT

Background processing for PCMCIA card service functions for registered Card Services clients includes a Card Services Background Processing Application and a Card Services dynamic link library (DDL) residing in the system VM, and a Card Services VxD residing in priority ring 0. A request for a Card Services function is generated by a Card Services function requester. The Card Services function requester is either a Card Services Client or a PCMCIA socket adapter. In response to the request, the Card Services VxD sets-up a path between the Card Services function requester and the Card Services DLL. The Card Services DLL contains the Card Services functions, and the appropriate Card Service function is executed. If the Card Service function requested requires background processing, the Card Services DLL posts a message with the Card Services Background Processing Application. The Card Services DLL then acknowledges the request for Card Services function to the Card Services requester. Upon selection of the Card Services Background Processing Application as an active process, the message posted is processed by executing the appropriate card services function in the Card Services DLL and providing any necessary callbacks.

29 Claims, 6 Drawing Sheets

METHOD AND APPARATUS FOR BACKGROUND PROCESSING FOR PCMCIA CARD SERVICES

BACKGROUND OF THE INVENTION

1. Field of the Invention

The present invention relates to the field of data processing, and more particularly, to providing background processing for PCMCIA Card Services operating under the Microsoft™ Windows v. 3.1 operating system environment.

2. Art Background

Laptop and notebook sized personal computers have become very common. In many existing laptop and notebook sized personal computers, it is difficult to add peripherals because there are no internal expansion slots. Peripherals can be connected to external ports on laptop and notebook sized personal computers. However, the external peripherals hang off the side of the portable computer system thereby making the system no longer portable.

To provide a convenient interface for small peripheral devices, a computer industry consortium drafted a specification defining a standard interface for credit-card sized peripherals. The computer industry consortium is known as the Personal Computer Memory Card Industry Association (PCMCIA) and the standard credit-card sized peripherals are known as PCMCIA Cards. The first version of the PCMCIA specification (PCMCIA 1.0) created an interface that could handle memory card expansion as well as some simple peripherals such as card-sized modems. The second version of the PCMCIA specification (PCMCIA 2.0) is a full bus specification capable of handling most common types of computer peripherals such as hard disk drives and LAN interfaces. (See *PC Card Standard*, Release 2.0, September 1991, Personal Computer Memory Card International Association)

The PCMCIA standard is defined such that it is possible to plug in and remove cards while the base system is running, without damage to the cards or to the base system. This hot insertion/removal feature is unique to PCMCIA computer hardware. Furthermore, configuration information is kept in memory on a PCMCIA card itself, to allow the system to adapt to the card when it is plugged into a computer system. The PCMCIA standard defines the physical size and shape of PCMCIA cards. The PCMCIA standard also defines power and voltage levels and connector pinouts. Cards which comply with the PCMCIA standard may be plugged into compatible systems without fear that the connectors won't match or that voltage differences will damage the hardware. The standard also defines the range of configuration information which may be kept on the cards, and indicates how software can read this information.

The PCMCIA hardware includes the socket into which the card is plugged, a connector for conveying power and information between the cards and the computer, and a socket adapter integrated circuit which couples the computer microprocessor to the sockets. The adapter contains hardware to generate microprocessor interrupts when a card hardware change event occurs, such as a cards being inserted or removed, or a card battery running low. Mapping hardware allows the card's memory, I/O, and interrupt to be directed to the proper places within the overall computer system. For example, if a card contains memory, the memory may be made to appear at any point in the computer's address space below 16 megabytes. Similarly, if a card can generate an interrupt request, the interrupt request can be routed to one of a number of system IRQ lines.

The Microsoft™ Windows operating environment is largely replacing the older DOS only environment in personal computers. The Microsoft™ Windows environment provides an attractive graphical user interface (GUI) which makes application programs easier to use. Currently, Windows application programs which require access to Card Services must use the existing real mode implementations of Socket Services and Card Services as device drivers or Terminate and Stay Resident (TSR) programs for DOS. This solution is not very attractive since the system must switch from protected mode, which is used to run Windows applications, into real mode in order to call the Card Services TSR.

In the prior art DOS real mode implementations of Card Services, the background processing is done by the Card Services TSR. The Card Services TSR sets-up a background processing operation and returns to the DOS application or the device driver that called the Card Services TSR. The Card Services TSR gains control of computer system resources only during a limited time based on the system clock ticks. When the time apportioned for background processing based on the clock ticks occurs, the Card Services TSR performs the necessary background processing. Although the DOS background processing using the clock ticks provides satisfactory performance in DOS, it does not provide sufficient performance when running Windows in enhanced mode. For example, when running the Windows enhanced mode, the clock ticks that permit background processing are unreliable and often do not occur frequently enough. Because the use of clock ticks is unreliable when running Windows in enhanced mode, background processing in accordance with the PCMCIA Card Services specification when running Windows in enhanced mode requires an alternative solution. The present invention provides an apparatus and methods for reliable background processing when running Windows in enhanced mode in accordance with the PCMCIA Card Services specification.

SUMMARY OF THE INVENTION

Therefore, it is an object of the present invention to provide background processing for PCMCIA Card Services operating under the Windows enhanced mode operating system environment.

This and other objects of the present invention are realized in an arrangement which includes a multi-tasking computer system comprising at least a central processing unit (CPU), a system memory and PCMCIA cards. The PCMCIA cards are each coupled to a PCMCIA socket, which in turn is coupled to PCMCIA card adapters. The PCMCIA card adapters couple the PCMCIA cards to the multi-tasking computer system. The Windows enhanced mode operating system resides in the system memory to provide preemptive multi-tasking among virtual machines (VMs). Specifically, the system memory is configured to include a system VM, DOS VMs and virtual device drivers (VxD) residing in a priority ring 0. Card service functions are performed for Card Services clients. The Card Services clients comprise Windows Applications contained in the system VM, DOS applications contained in DOS VMs, and VxD drivers in priority ring 0.

The present invention provides background processing for PCMCIA card service functions for registered Card Services clients. In order to perform the background processing, the present invention comprises a Card Services Background Processing Application and a Card Services dynamic link library (DLL) residing in the system VM, and a Card Services VxD residing in priority ring 0. A request for a Card Services function is generated by a Card Services function requester. The Card Services function requester is either a Card Services Client or a PCMCIA socket adapter. In response to the request, the Card Services VxD sets-up a path between the Card Services function requester and the Card Services DLL. The Card Services DLL contains the Card Services functions, and the appropriate Card Service function is executed. If the Card Service function requested requires background processing, the Card Services DLL posts a message with the Card Services Background Processing Application. The Card Services DLL then acknowledges the request for the Card Services function to the Card Services requester. Upon selection of the Card Services Background Processing Application as an active process, the message posted is processed by executing the appropriate card services function in the Card Services DLL and providing any necessary callbacks.

BRIEF DESCRIPTION OF THE DRAWINGS

The objects features and advantages of the present invention will be apparent from the following detailed description of the preferred embodiment of the invention with references to the drawings in which.

NOTATION AND NOMENCLATURE

Figure 1:
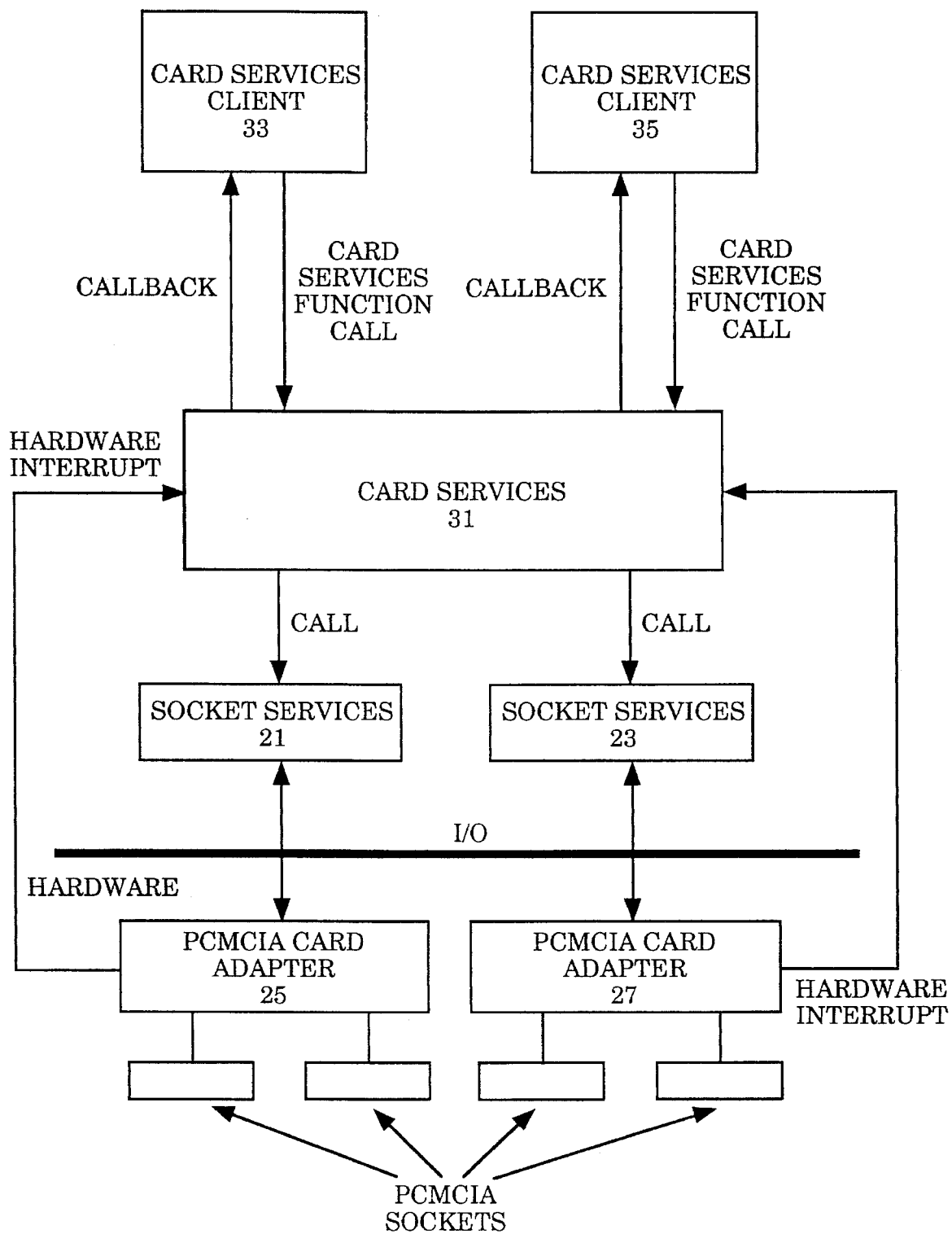
FIG. 1 is a block diagram illustrating the Card Services and Socket Services software layers configured in accordance with the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Intel Corporation, as well as other manufacturers of computer systems.

DETAILED DESCRIPTION OF THE INVENTION

A method and apparatus for background processing of PCMCIA Card Service functions operating under the Microsoft™ Windows v. 3.1 operating system environment are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

The current PCMCIA standard defines two layers of software that a computer system uses to access and manage PCMCIA cards. The two layers of software are called the Socket Services layer and the Card Services layer. FIG. 1 illustrates how the Socket Services and Card Services software layers are related for accessing the PCMCIA cards.

A Socket Services layer is implemented for each particular PCMCIA socket adapter in the system. Each Socket Services implementation provides a set of routines used configure and control the corresponding PCMCIA Socket. Referring to FIG. 1, there is a different implementation of Socket Services (21 and 23) for each particular PCMCIA socket adapter (25 and 27, respectively) in the system. The Socket Services layer is designed such that it can be implemented in ROM and can be part of the system BIOS. The functions in the Socket Services software layer are called by the Card Services layer 31 using the software interrupt mechanism (INT 1A). The Socket Services layer is independent of the operating system running on the computer system. (See *PCMCIA Socket Services Interface Specification*, Release 2.00, September 1992, Personal Computer Memory Card International Association)

The Card Services software layer is designed to run on top of one or more instances of Socket Services. Card Services provide a set of functions which Card Services clients use to access and configure PCMCIA cards. Referring to FIG. 1, the Card Services software layer 31 is located above each implementation of Socket Services and calls the routines from each Socket Services implementation to perform hardware specific functions. The Card Services software layer 31 is operating system dependent and it is usually loaded during operating system startup. Like the Socket Services functions, the Card Services functions are usually called by Card Services clients (33 and 35) using the software interrupt mechanism (INT 1A with the AH register set to the hexadecimal value AF). The Card Services layer 31 is designed to hide the different PCMCIA socket adapters from Card Services clients (33 and 35), such that the Card Services clients (33 and 35) always have a consistent interface to PCMCIA Cards. (See *PC Card Services Interface Specification*, Release 2.00, September 1992, Personal Computer Memory Card International Association)

The Socket Services and Card Services layers are designed such that a single system may have several instances of Socket Services (each instance of Socket Services serving a corresponding PCMCIA adapter), but only a single instance of Card Services. Clients of the Card Services layer see only a number of PCMCIA sockets available but not a number of PCMCIA adapters each of which has one or more sockets. This abstraction, and the configuration management support, are the primary reasons for the Card Services software layer.

In operation, applications that desire to use PCMCIA cards access the PCMCIA cards via the Card Services functions. Applications which use the Card Services functions are known as Card Services clients.' A Card Services client registers with Card Services initially, giving Card Services the address of a client callback routine. Card Services executes the callback routine when a PCMCIA card related event occurs. For example, when a hardware interrupt from a PCMCIA card socket occurs, the client's callback routine performs processing associated with the event. Events include hardware events such as card insertion/removal or low battery and software events such as a client requesting exclusive use of a card. Upon card insertion, a registered client might use the callback routine to query the card to determine the card's type. If card was the correct type it would then proceed to configure the card. The card's onboard memory, I/O, and interrupt are set up to interface the system with the card. Card Services functions enable clients to configure cards by programming the card hardware registers and the PCMCIA adapter.

Figure 2:
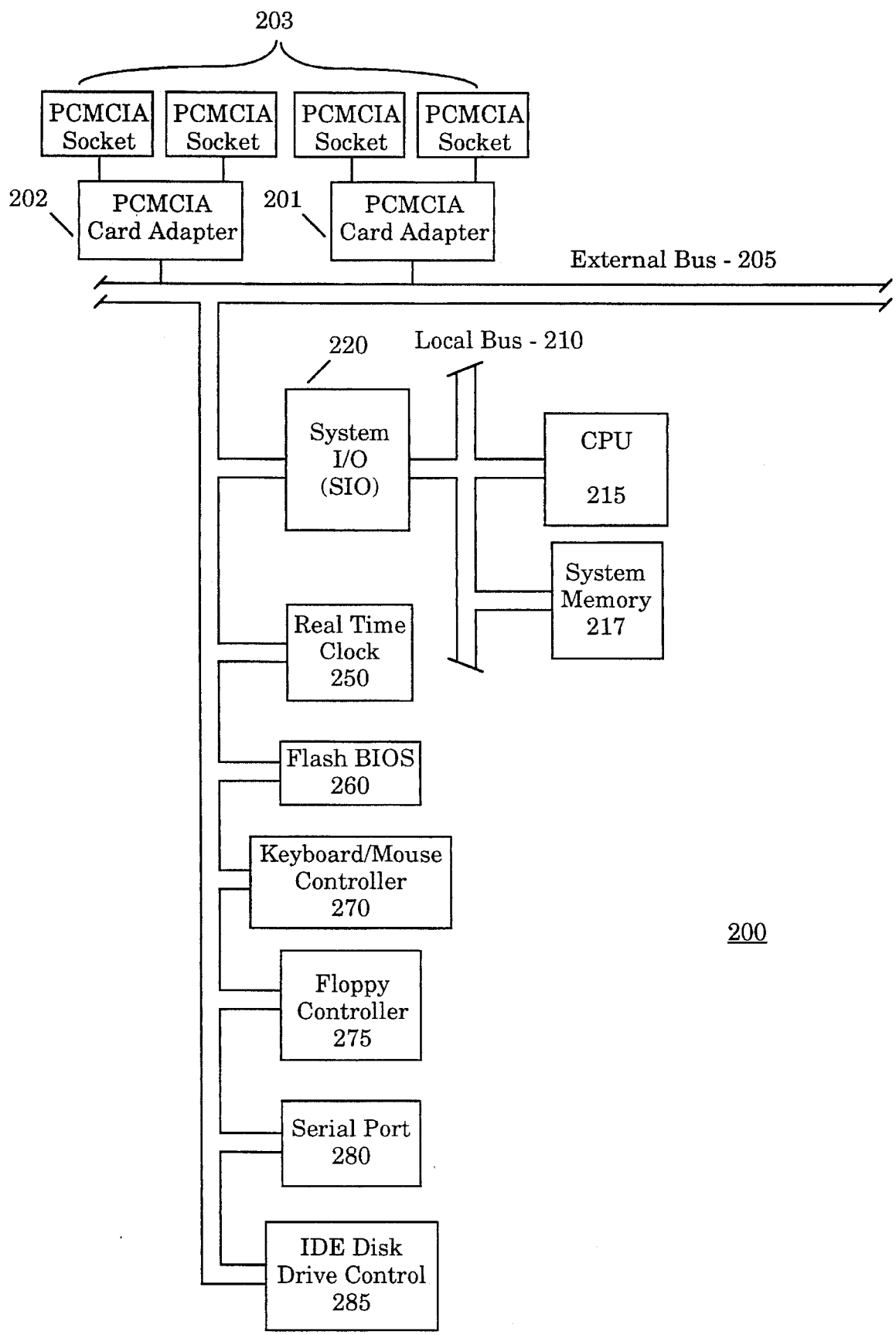
FIG. 2 illustrates a high level block diagram of a computer system incorporating the teachings of the present invention.

Referring to FIG. 2, a high level block diagram of a computer system incorporating the teachings of the present invention is illustrated. The present invention operates on a computer system 200 comprising an Intel™ 80386 microprocessor or later revisions for a central processing unit (CPU) 215. In a simplest configuration, the CPU 215 is coupled to a system memory 217 via a local bus 210. The local bus 210 is also coupled to a system input/output (SIO) interface 220. The SIO interface 220 couples the CPU 215 and the system memory 217 to a plurality of external devices such as a real time clock 250, a flash BIOS 260, a Keyboard/Mouse controller 270, a floppy controller 275, a serial port 280 and an IDE Disk Drive Control 285. In addition, a plurality of PCMCIA sockets 203 for supporting PCMCIA cards are shown. The PCMCIA sockets are coupled to PCMCIA Card adapters 201 and 202, and the PCMCIA card adapters 201 and 202 are coupled to the External Bus 205.

The PCMCIA cards provide additional functions to computer system 200. For example, the PCMCIA cards may comprise additional memory, a modem or a network interface. For the present invention, the computer system 200 operates in conjunction with PCMCIA sockets 203, PCMCIA card adapters 202 and 202 and PCMCIA cards. However, the computer system 200 is intended to represent a broad category of data processing devices.

The CPU 215 is capable of operating in either a real mode or in a protected mode. The real mode references the fact that all addresses to the corresponding system memory 217 refer to physical addresses. Therefore, when the CPU 215 is running under real mode, it is limited to the 8086 conventional memory space. When the processor is operating under protected mode, access to the system memory 217 is provided by a set of processor protected descriptor segments. In contrast to operation under the real mode, the protected mode permits the CPU 215 to access the entire linear address space within the system memory 217. Because of this, the real mode is limited to only providing memory management, but the protected mode provides both memory management and memory protection. The protected mode can be either 16 bit or 32 bit. Under the 16 bit mode operation, provided in conjunction with an Intel™ 80286 microprocessor, a 64k code and data segment is used. In a 32 bit protected mode, provided in conjunction with an Intel™ 80386 microprocessor, all segments of code and data are assumed to be 32 bits wide, resulting in 4 gigabyte of virtual memory. The protected mode breaks the 1 MB system memory barrier limited to real mode applications.

The present invention provides an implementation of the PCMCIA Card Services software layer for Microsoft™ Windows. The Card Services implementation of the present invention is designed to operate only in the enhanced mode of Microsoft™ Windows. In order to sufficiently describe the Card Services implementation of the present invention, an overview of the enhanced mode of the Microsoft™ Windows operating system is provided.

Figure 3:
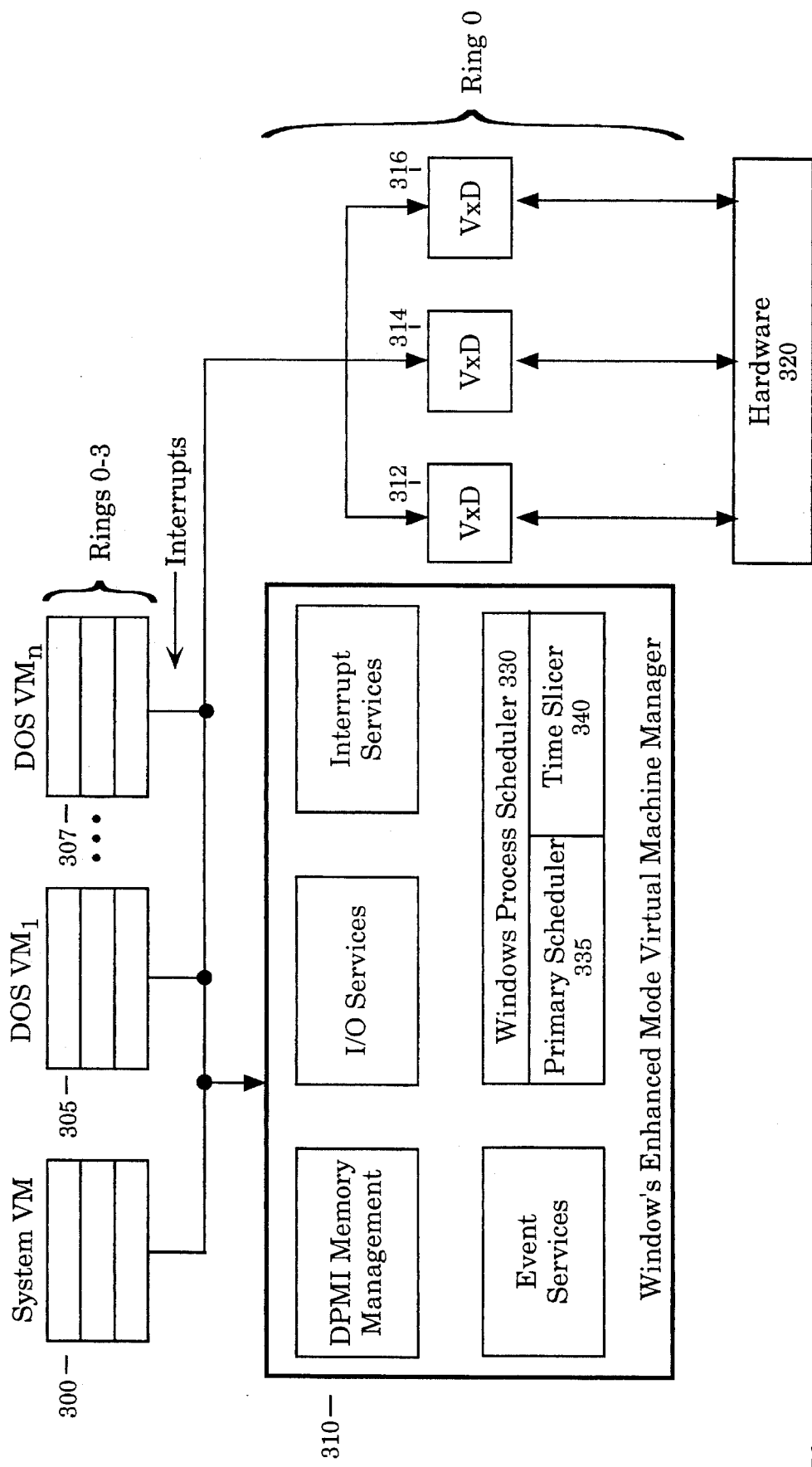
FIG. 3 illustrates a high level block diagram of Windows system software configured in accordance with the present invention.

Referring to FIG. 3, a high level system block diagram of Windows system software configured in accordance with the present invention is illustrated. The Windows system software supports a system VM 300 and a plurality of DOS VMs, 1 through n. The system and DOS VMs are coupled to a Windows Virtual Machine Manager 310. The system VM and DOS VMs are also coupled to a plurality of virtual device drivers (VxDs) 312, 314 and 316. The Windows Virtual Machine Manager 310 is a layer of Windows system software for coordinating the operation of each VM and VxDs active in the computer system.

The Windows Virtual Machine Manager 310 is composed of several portions. The Windows Virtual Machine Manager 310 schedules tasks among all the DOS VMs and the system VM via a Windows Process Scheduler 330. The Windows Virtual Machine Manager 310 may interface with any VxD installed. In addition, the Windows Virtual Machine Manager 310 provides I/O emulation, virtual memory management, general interrupt handling and event servicing. A series of selector values provided to the Windows Virtual Machine Manager 310 results in direct access of physical locations in the lower one megabyte of system memory. Memory management under Windows basically consists of a kernel map manager and a Windows virtual memory manager including the DOS protected mode interface (DPMI).

The Intel™ 80386 and 80486 microprocessors provide system memory protection through segmentation and paging. The protection levels are represented by a four ring system. The lower the number of the ring the higher the privilege rating. Therefore, ring 0, as shown in FIG. 3, is used for the virtual device drivers in other essential components of the operating system including the Windows Virtual Machine Manager 310. The Windows v 3.1 enhanced mode runs all Windows applications and DOS VMs at level 3. The Intel™ 80386 and 80486 protected mode processors provide the capability for preemptive hardware based multi-tasking among virtual machines. In preemptive multi-tasking, a switch between tasks is forced resulting in the active task involuntarily relinquishing control of the system. In non-preemptive multi-tasking, the active task must voluntarily relinquish control of the system. The present invention utilizes the preemptive multi-tasking capability of Windows version 3.1 enhanced mode. The preemptive multi-tasking in the Windows enhanced mode is accomplished through selection of VMs via a round-robin technique. However, multiple Windows applications within the system VM are non-preemptive in that the active Windows application must voluntarily relinquish control to system.

A plurality of virtual device drivers (VxD) are also shown in FIG. 3. The VxDs are not contained in a VM, but are contained in a ring 0. In Windows enhanced mode, the VxDs provide a 32 bit flat model program. The VxDs are loaded along with the Windows 3.1 while the system is still in real mode. In general, the VxD virtualizes access to hardware by providing a buffer between the system drivers and hardware devices. The VxD, running at ring level 0, has access to the entire 4 gigabyte address space, as well as all the VMs at all times. This permits bridging among virtual machines as explained more fully below. For further information concerning the Windows v 3.1 enhanced mode, see *Guide to Programming*, Microsoft™ Windows Software Development Kit, Microsoft™, 1987–1992, and *Programming Windows 3.1*, 3rd edition, Charles Petzold, Microsoft™ Press, 1992.

Figure 4:
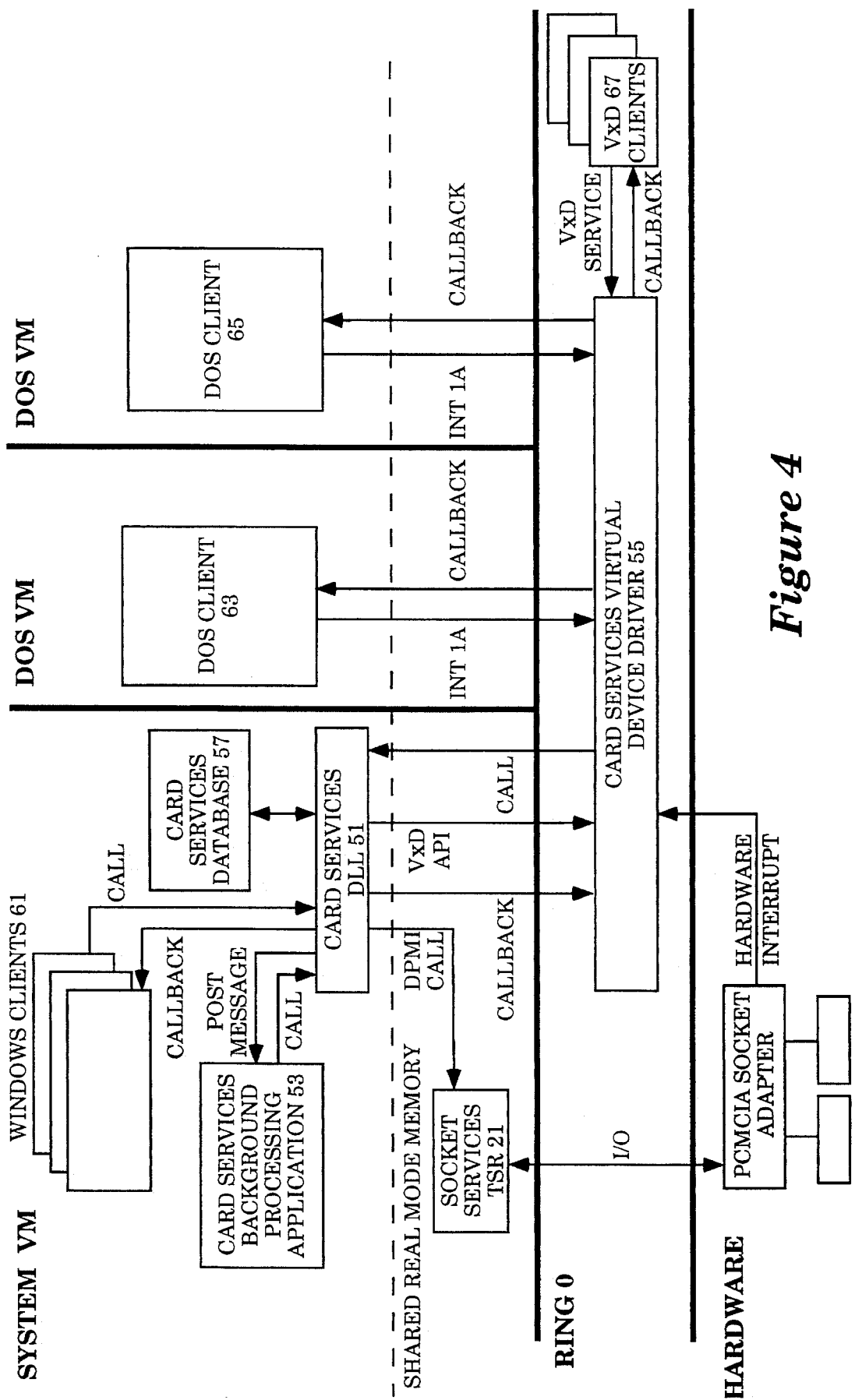
FIG. 4 illustrates a block diagram of computer system software configured in accordance with the present invention.

Referring to FIG. 4, a block diagram of computer system software configured in accordance with the present invention is illustrated. The system software, residing in the system memory, comprises a system VM and a plurality of DOS VMs. Located in ring 0 is a Card Services VxD 55 which is coupled to a plurality of VxD clients 67, the DOS VMs and the VM. As shown in FIG. 4, a plurality of Windows applications and dynamic link libraries (DLLs) reside within the system VM. Specifically, a Card Services DLL 51, coupled to a Card Services database 57, and a Card Services Background Application 53 are contained in the system VM. In addition, the shared memory portion of the computer system is illustrated containing a socket services TSR 21, and at the hardware level, a PCMCIA Socket Adapter and associated PC cards are illustrated.

The Card Services VxD 55 provides a number of different services for the Card Services implementation of the present invention. Microsoft™ Windows VxDs have a number of unique features that make VxDs very useful. For example, VxDs are not dedicated to any particular VM, and the VxDs are accessible from any application process running in any VM. Since VxDs run at privilege ring 0, a VxD accesses all I/O ports directly and the entire memory address space of the machine.

Requests for card service functions in the Card Services DLL may be made by either a PCMCIA socket adapter, for status change interrupts, or by a registered Card Services Client. Generally, the Card Services Client and the PCMCIA socket adapter are designated as a card services requester. To perform background processing for Card Services, the present invention utilizes a Windows application called the Card Services Background Processing Application. As shown in FIG. 4, the Card Services Background Processing Application 53 resides within the system VM. The Card Services Background Processing Application 53 operates like most Windows applications in that it is message driven. The Card Services Background Processing Application 53 monitors an input message queue and processes messages received on the queue.

The Card Services DLL 51 posts a message with the Card Services Background Processing Application 53 when a Card Services function requires background processing. To initiate background processing, a Card Services function in the Card Services DLL 51 calls the Windows routine PostMessage() to place a message on the Card Services Background Processing Application 53 message queue. Eventually, the Windows Process Scheduler selects the Card Services Background Processing Application 53 as the active process. After the Card Services Background Processing Application 53 is selected, it retrieves the message from the message queue and performs the background processing.

To invoke background processing in the Card Services Background Processing Application 53, a message is posted in the Application queue. A message comprises a window handle, an unsigned integer value and additional information associated with the message. The window handle specifies the destination of the message, and the integer value identifies the message.

The PCMCIA Card Services specification requires that hardware events generated by the PCMCIA adapters, such as card insertion, be processed in the background. Therefore, when a hardware event is detected, and the proper Card Services interrupt handling function in the Card Services DLL is called, the interrupt handling function posts a message to the Card Services Windows Application 53. The Card Services Windows Application 53 eventually retrieves the message from its message queue and processes the message. The use of the Windows messaging mechanism ensures that interrupt processing occurs in the same order that the hardware interrupts occurred.

The PCMCIA Card Services specification requires the Card Services software layer catch all status change interrupts generated by the PCMCIA socket adapters. Upon receiving the status change interrupts, the Card Services software layer informs registered Card Services clients. The Windows enhanced mode environment permits several Card Services clients to operate simultaneously in different VMs. To inform the registered Card Services clients about the status change interrupts, the Card Services implementation of the present invention utilizes the Card Services VxD 55.

To handle the status change interrupts from the PCMCIA socket adapters, the Card Services VxD 55 first sets up an IRQ for each socket adapter. To set up an IRQ, the Card Services VxD 55 calls the services of the Virtual PIC Driver (VPICD). The Card Services VxD 55 virtualizes the status change interrupts by calling VPICD_Virtualize_IRQ routine along with an IRQ descriptor. The IRQ descriptor includes an IRQ number and an address of an interrupt handling routine within the Card Services VxD 55. After the Card Services VxD 55 has virtualized the IRQ, the Card Services VxD's hardware interrupt handling routine is called whenever a PCMCIA socket adapter generates a status change interrupt.

Figure 5:
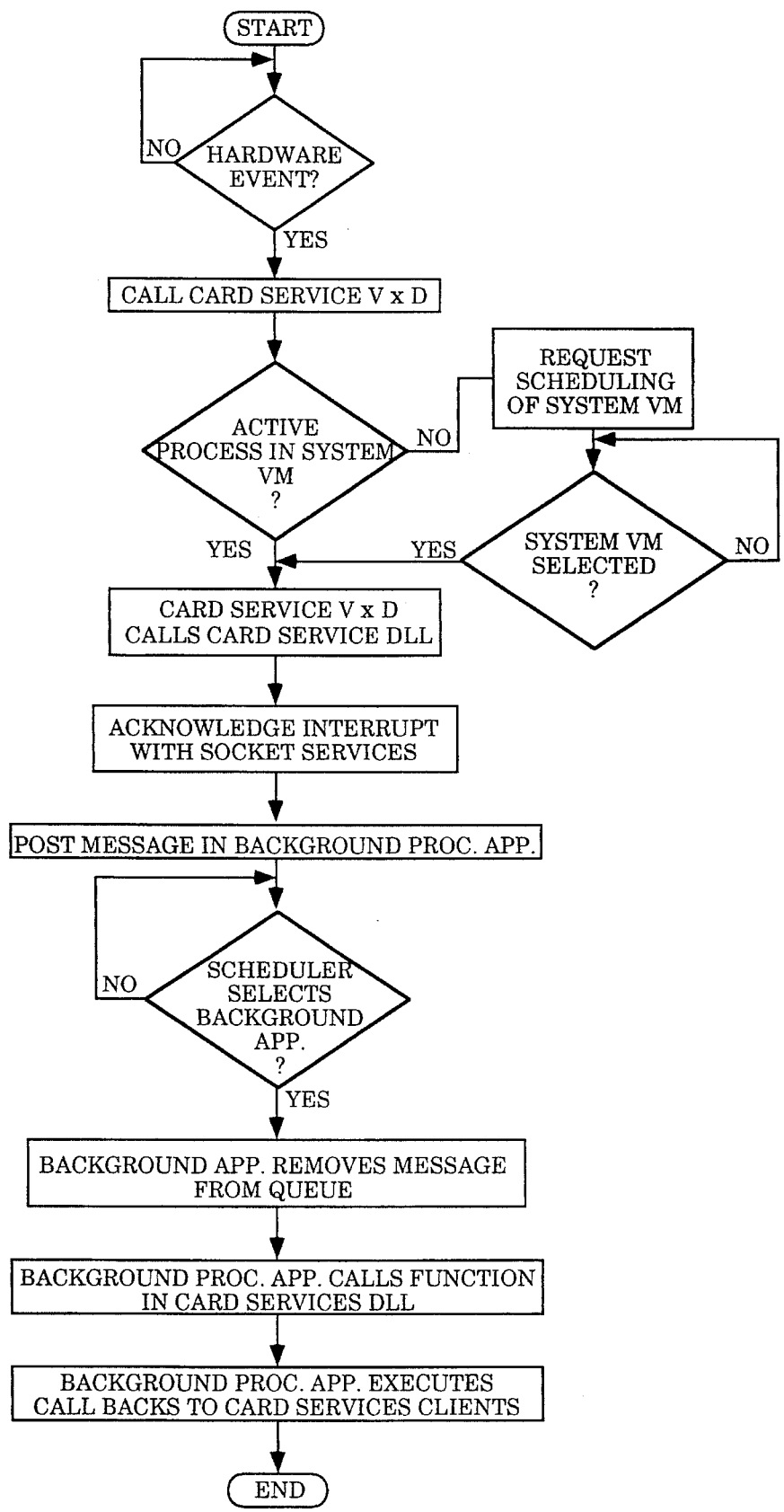
FIG. 5 illustrates a flow diagram for the method of background processing for hardware events incorporating the teachings of the present invention.
Figure 6:
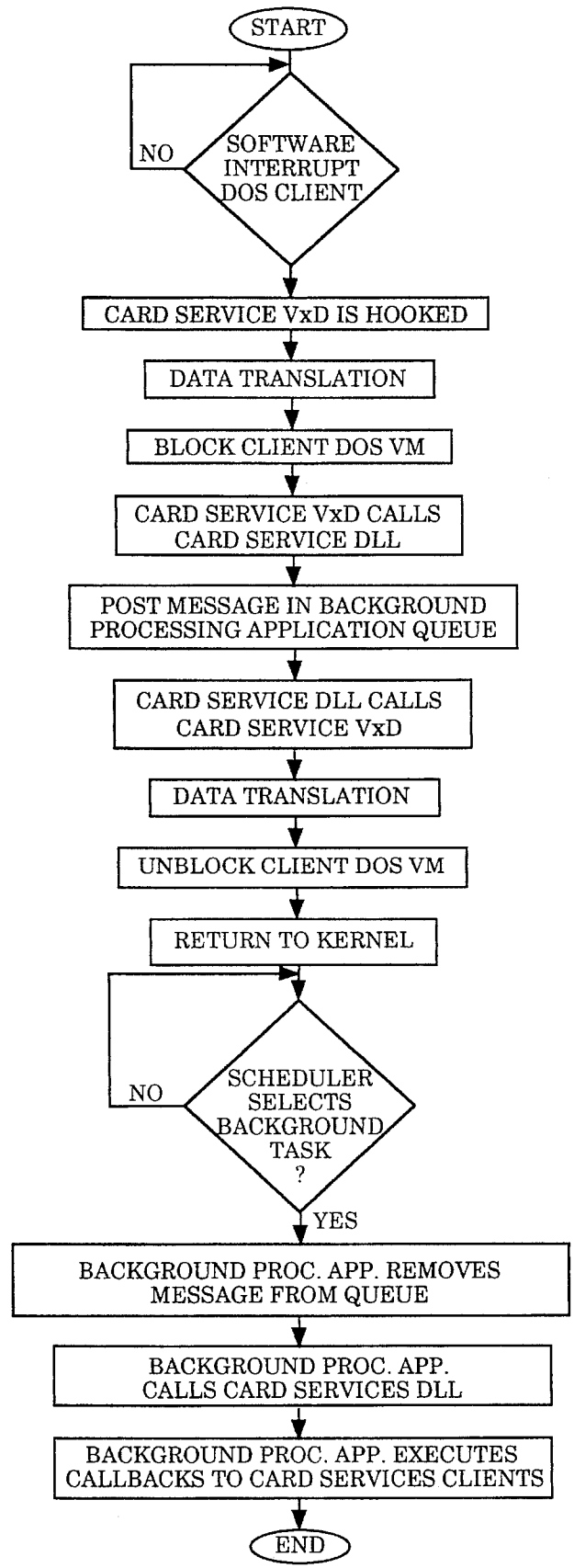
FIG. 6 illustrates a flow diagram for the method of background processing for DOS clients incorporating the teachings of the present invention.

Referring to FIG. 5, a flow diagram for a method of background processing for hardware events configured in accordance with the present invention is illustrated. To handle a status change interrupt generated by a PCMCIA socket adapter, the following sequence of events occur. First, the Card Services VxD's hardware interrupt handling routine is called when a hardware status interrupt is generated. If the System VM is not running when the interrupt occurs, then the interrupt handling routine requests the Windows Process Scheduler to switch to the system VM. Once the system VM gains control of the CPU, the interrupt handling routine accesses the Card Services DLL 51. Next, the Card Services VxD 55 calls the appropriate hardware interrupt function in the Card Services DLL 51.

The hardware interrupt function in the Card Services DLL 51 function handles hardware events by first acknowledging the interrupt with Socket Services and then posting a message to the Card Services Background Processing Application 53. As previously explained, the Card Services Background Processing Application 53 processes the hardware interrupt in the "background". After posting the message the Card Services DLL 51 function completes and returns to the Card Services VxD 55. Since Card Services DLL 51 handled the interrupt, the Card Services VxD 55 signals an end to the interrupt routine.

During client registration, an address to a callback routine is provided by each Card Services client. In addition to providing an address to the callback routine, each Card Services client specifies the hardware events for which that particular Card Services client desires a callback. Accordingly, a Card Services client elects to receive a callback upon an occurance of a hardware event on an event by event basis. The Card Services Background Processing Application 53 handles hardware events by calling the callback routine. In addition to handling Card Services functions calls for Card Services clients located in DOS VMs, the Card Services VxD 55 also performs callbacks into DOS VMs. For example, to notify a Card Services client located in DOS VM about a hardware interrupt, the Card Services VxD 55 executes the callback routine for the DOS VM Card Services client.

A callback into a DOS VM is initiated by the Card Services Background Processing Application 53. The Card Services Background Processing Application 53 requests a callback into a DOS VM client by calling a callback handling routine in the Card Services VxD 55. The Card Services VxD 55 then schedules a task switch into the DOS VM. After the kernel has switched into the specified DOS VM, the Card Services VxD 55 calls the system routine Begin_Nest_V86_Exec to prepare for nested execution into the DOS VM. The Card Services VxD 55 then calls the callback routine specified by the DOS VM. After completing the callback routine, the Card Services VxD 55 calls the system routine End_Nest_Exec to restore the DOS VM state.

In addition to the status change interrupts, background processing is required for other Card Service functions initiated from Card Services clients. For example, background processing is required for client registration and exclusive card use requests. In general, Card Services Clients comprise Windows Applications contained in the system VM, DOS applications contained in DOS VMs, and VxD drivers in priority ring 0. The present invention provides background processing for Windows application Clients, DOS application clients and VxD clients requesting card services functions. In order to provide background processing for Windows Applications requiring Card Services functions, Windows Applications 61 calls the Card Services DLL 51. Since Windows Applications 61 and the Card Services DLL 51 reside in the system VM, the call from the Windows Application is made directly to the Card Services DLL 51. If the Card Services function requested requires background processing, the Card Services DLL 51 posts a message in the Card Services Background Application 53 message queue. The Card Services DLL 51 then returns control to the Windows Client requesting the card services.

At a later time, the Card Services Background Processing Application 53 is selected as the active process. When the Card Services Background Processing Application 53 gains control, it removes the message from the message queue. The Card Services Background Processing Application 53 then performs the card services function by calling the appropriate functions in the Card Services DLL 51. As part of the background processing, the Card Services Background Processing Application 53 may perform callbacks to the Card Services Clients depending upon the card service function and the particular Card Services Client set-up during client registration. For example, to use a callback routine provided by a Windows application client, the Card Services Background Processing Application 53 calls a subroutine located at the callback address provided.

Card Services clients also comprise DOS Applications running in DOS VMs. In order to provide background processing for DOS Applications requiring Card Services, the DOS application accesses the Card Services DLL and the Card Services Background Processing Application residing in the system VM. Since the DOS VMs operate in Virtual 8086 Mode, a DOS application may only access system memory for that particular DOS VM including the system shared memory. Therefore, DOS applications and DOS device drivers operating in a DOS VM can't directly access the Card Services DLL 51 and the Card Services Background processing Application 53 located within the system VM.

To provide access from Card Services clients located in DOS VMs to the Card Services DLL 51 and the Card Services Background Processing Application 53, the present invention utilizes the Card Services VxD 55. In order to maintain compatibility with existing DOS applications that use standard PCMCIA Cards, the Card Services VxD 55 provides Card Services to DOS Virtual Machines in a manner such that the DOS clients use the standard real mode Card Services Binding defined in the PCMCIA Card Services Specification. Specifically, Card Services clients located in DOS VMs access Card Services functions by loading the AH register with the hexadecimal value AF and executing an INT 1A software interrupt instruction. (See Appendix D of the *PC Card Services Interface Specification*, Release 2.00, September 1992, Personal Computer Memory Card International Association)

To catch the Card Services function requests from Card Services clients located in DOS VMs, the Card Services VxD 55 must "hook" the INT 1A software interrupt. The Card Services VxD 55 hooks the INT 1A software interrupt by calling the Hook_V86_Int_Chain routine with the 1A interrupt number and the address of an API Client routine in the Card Services VxD 55 which handles Card Services function calls from DOS clients. After hooking the INT 1A software interrupt, all future Card Service function calls by DOS applications or device drivers operating in DOS virtual machines will be routed to the Card Services VxD 55.

Card Services function calls from Card Services clients in DOS virtual machines are handled by the Card Services VxD 55 in the following manner. First, the Card Services client in a DOS VM sets up the function parameters for a Card Services function call and executes the INT 1A software interrupt. The Card Services VxD 55 gets control after the interrupt since it has "hooked" the INT 1A software interrupt. After obtaining control, the Card Services VxD 55 cannot immediately call the required function in the Card Services DLL 51 since any function parameters supplied by the client in the DOS VM are in virtual 8086 mode. The Card Services VxD 55 translates the virtual 8086 mode data parameters into 16 bit protected mode data parameters. The 16 bit protected mode 8086 data parameters are accessible by the Card Services DLL 51 and the Card Services Background Processing Application 53. For a detailed description of data parameter translation, see United States Patent Application "Method and Apparatus for Code Sharing Among Virtual Machines in a Preemptive Multi-tasking Computer System", filed concurrently herewith, by Sandage et al. on Apr. 1, 1993 and under Ser. No. 08/041,785 and assigned to the assignee of the present invention, Intel Corporation, Santa Clara, Calif.

After the data parameters are translated, the Card Services VxD 55 requests the Windows Process scheduler in the Windows kernel to suspend execution or block on the DOS VM containing the Card Services client requesting Card Services. The Card Services VxD 55 also requests the Windows Process scheduler to schedule the System VM so that the Card Services DLL 51 and the Card Services Background Processing Application 53 gain control of the system. The Card Services VxD 55 then calls the Card Services function within the Card Services DLL 51. If the Card Service requested in the Card Services DLL requires background processing, then the Card Services DLL posts a message in the message queue for the Card Services Background Processing Application 53.

Upon completion of posting the message into the Card Services Background Processing Application message queue, the thread of execution is transferred back to the Card Services VxD 55. The Card Services VxD 55 translates any return data parameters from 16 bit protected mode to virtual 8086 mode. In addition, the Card Services VxD 55 unblocks the requesting DOS application's DOS VM. The DOS VM requesting the Card Service function is free for selection by the Windows Process Scheduler. When the DOS VM is next scheduled for execution, processing in the DOS application resumes with an instruction after the INT 1A software interrupt instruction.

As explained above in conjunction with handling of hardware events, the background processing for the Card Service function requested is performed after selection of the Card Services Background Processing Application 53 by the Windows Process Scheduler. As part of the background processing by the Card Services Background Processing Application 53, callbacks to the Card Services clients may be performed. To use a callback routine provided by a DOS application client or a VxD client, the Card Services Windows Application 53 calls a routine in the Card Services VxD 55. The Card Services VxD 55 then executes the callback routine in the DOS application client or a VxD client.

The Card Services VxD 55 provides Card Services to other Windows VxDs. Referring to FIG. 4, VxDs 67 call Card Services functions by making a VxD service call into the Card Services VxD 55. The Card Services VxD 55 then executes the Card Services function calls by translating data parameters and calling into the Card Services DLL 51. This is performed in essentially the same manner as described in the previous section on providing Card Services functions to Card Services clients located in DOS VMs. Background processing is provided by the Card Services Background Application 53 for VxD Clients 67. The Card Services VxD 55 also handles callbacks into VxDs that are Card Services clients.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a multi-tasking computer system operating under a Windows enhanced mode operating system, a method for processing for PCMCIA Card Services comprising the steps of:

providing a system virtual machine including a Card Services dynamic link library (DLL) having a plurality of Card Services functions;

generating from a Card Services Requester a request for performing one of said plurality of Card Services functions;

routing said request from said Card Services Requester to said Card Services DLL;

performing within said system virtual machine said requested one of said plurality of Card Services functions.

2. A method as described in claim 1 wherein said step of performing comprises the step of executing said requested one of said plurality of Card Services functions within said Card Services DLL.

3. A method as described in claim 1 wherein said step of providing a system virtual machine includes the step of providing a Card Services Background Processing Application within said system virtual machine, and wherein said step of performing said requested one of said plurality of Card Services functions comprises the steps of:

posting a message by said Card Services DLL for receipt by said Card Services Background Processing Application, said message including a request for background processing of said requested one of said plurality of Card Services functions;

receiving said message posted in said Card Services Background Processing Application, said Card Services Background Processing Application being invoked as a background process by said operating system; and executing said Card Services function within said Card Services Background Processing Application in accordance with said message posted.

4. A method as described in claim 1 wherein said Card Services Requester is a registered Card Services client and wherein said step of performing comprises the step of providing a callback to said Card Services client.

5. A method as described in claim 1 wherein said step of routing said request comprises the step of providing a path between said Card Services Requester and said Card Services DLL wherein said path is set up by a Card Services virtual device driver residing in ring 0 of said multi-tasking computer system.

6. A method as described in claim 1 further comprising the step of acknowledging to said Card Services Requester receipt of said request by said Card Services DLL.

7. A method as described in claim 6 wherein said Card Services Requester is a PCMCIA socket adapter and wherein said step of generating a request comprises the step of generating a hardware interrupt from said PCMCIA socket adapter to signify a hardware status change.

8. A method as described in claim 7 wherein the step of acknowledging receipt of said request comprises the steps of:

calling a DPMI request to a socket service terminate and stay resident (TSR) routine; and calling said PCMCIA socket adapter from said TSR routine.

9. A method as described in claim 6 wherein said Card Services Requester is a DOS application residing in a DOS virtual machine and wherein the step of generating a request comprises the step of generating a software interrupt from said DOS application.

10. A method as described in claim 9 wherein the step of acknowledging receipt of said request comprises the step of executing a callback routine in said DOS application.

11. A method as described in claim 6 wherein said Card Services Requester is a Windows application residing in said system virtual machine and wherein the step of generating a request comprises the step of generating a call from said Windows application.

12. A method as described in claim 11 wherein the step of acknowledging receipt of said request comprises the step of executing a callback routine in said Windows application.

13. A method as described in claim 6 wherein said Card Services Requester is a virtual device driver and wherein said step of generating a request comprises the step of generating a virtual device driver service request.

14. A method as described in claim 13 wherein the step of acknowledging receipt of said request comprises the step of executing a callback routine in said virtual device driver.

15. In a multi-tasking computer system operating under a Windows enhanced mode operating system, said multi-tasking computer system supporting a plurality of virtual machines including a system virtual machine and DOS virtual machines, an apparatus for processing for PCMCIA Card Services comprising:

a system virtual machine including a Card Services dynamic link library (DLL) having a plurality of Card Services functions;

Card Services Requester means for generating a request for performing one of said plurality of Card Services functions;

means coupled to said Card Services Requester and to said Card Services DLL for routing said request from said Card Services Requester to said Card Services DLL;

means in said system virtual machine for performing said requested one of said plurality of Card Services functions.

16. An apparatus as described in claim 15 wherein said means for performing comprises means for executing said requested one of said plurality of Card Services functions within said Card Services DLL.

17. An apparatus as described in claim 15 wherein said system virtual machine further includes a Card Services Background Processing Application and wherein said means for performing said requested one of said plurality of Card Services functions comprises:

means within said Card Services DLL for posting a message for receipt by said Card Services Background Processing Application;

means within said operating system for invoking said Card Services Background Processing Application as a background process;

means within said Card Services Background Processing Application for receiving said message posted and for executing said requested one of said Card Services functions in accordance with said message posted.

18. An apparatus as described in claim 17 wherein said means for performing said requested one of said plurality of Card Services functions further comprises a first-in-first-out message queue for receiving said message from said means for posting a message and wherein said means for receiving said message posted receives said message from said queue.

19. An apparatus as described in claim 15 wherein said Card Services Requester is a registered Card Services client and wherein said means for performing comprises means for providing a callback to said Card Services client.

20. An apparatus as described in claim 15 wherein said means for routing comprises a Card Services virtual device driver residing in ring 0 of said multi-tasking computer system.

21. An apparatus as described in claim 15 further comprising means for acknowledging to said Card Services Requester receipt of said request by said Card Services DLL.

22. An apparatus as described in claim 21 wherein said Card Services Requester means is a PCMCIA socket adapter and wherein said request comprises a hardware interrupt from said PCMCIA socket adapter to signify a hardware status change.

23. An apparatus as described in claim 22 wherein said means for acknowledging comprises interface means including a terminate and stay resident (TSR) routine, said interface means calling a DPMI request to said TSR routine and said TSR routine calling said PCMCIA socket adapter.

24. An apparatus as described in claim 21 wherein said Card Services Requester means is a DOS application residing in one of said DOS virtual machines and wherein said request comprises a software interrupt from said DOS application.

25. An apparatus as described in claim 24 wherein said means for acknowledging comprises interface means for executing a callback routine in said DOS application.

26. An apparatus as described in claim 21 wherein said Card Services Requester means is a Windows application residing in said system virtual machine and wherein said request comprises a Windows application call.

27. An apparatus as described in claim 26 wherein said means for acknowledging comprises interface means for executing a call back routine in said Windows application.

28. An apparatus as described in claim 21 wherein said Card Services Requester means is a virtual device driver and wherein said request comprises a virtual device driver service request.

29. An apparatus as described in claim 28 wherein said means for acknowledging comprises interface means for executing a callback routine in said virtual device driver.

* * * * *